(12) United States Patent
Stachowiak

(10) Patent No.: US 6,475,626 B1
(45) Date of Patent: Nov. 5, 2002

(54) LOW-E MATCHABLE COATED ARTICLES AND METHODS OF MAKING SAME

(75) Inventor: Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/793,404

(22) Filed: Feb. 27, 2001

Related U.S. Application Data (63) Continuation-in-part of application No. 09/455,026, filed on Dec. 6, 1999.

(51) Int. Cl.$^7$ .......................... B32B 17/06; C03C 17/34
(52) U.S. Cl. ...................... 428/428; 428/336; 428/432; 428/448; 428/450; 428/472; 428/34; 428/622; 428/627; 428/673; 428/680; 428/698; 428/699; 359/586; 359/585; 359/359; 359/360
(58) Field of Search ................................ 428/622, 623, 428/627, 630, 632, 680, 34, 46, 673, 426, 216, 428, 432, 469, 472, 698, 699, 336, 448, 450; 359/585, 586, 359, 360

(56) References Cited

U.S. PATENT DOCUMENTS

| | | |
|---|---|---|
| 3,272,986 A | 9/1966 | Schmidt |
| 3,681,042 A | 8/1972 | Edwards et al. |
| 3,682,528 A | 8/1972 | Apfel et al. |
| 3,798,146 A | 3/1974 | Chong et al. |
| 3,826,728 A | 7/1974 | Chambers et al. |
| 3,935,351 A | 1/1976 | Franz et al. |
| 4,166,018 A | 8/1979 | Chapin et al. |
| 4,179,181 A | 12/1979 | Chang |
| 4,413,877 A | 11/1983 | Suzuki et al. |
| 4,462,883 A | 7/1984 | Hart |
| 4,594,137 A | 6/1986 | Gillery et al. |

(List continued on next page.)

FOREIGN PATENT DOCUMENTS

| | | |
|---|---|---|
| EP | 0301755 | 2/1989 |
| EP | 0332717 | 9/1989 |
| EP | 0386993 | 9/1990 |
| EP | 0456487 | 11/1991 |
| EP | 0546302 | 6/1993 |
| EP | 0546470 | 6/1993 |

(List continued on next page.)

OTHER PUBLICATIONS

US 4,960,645, 10/1990, Lingle et al. (withdrawn)
Technical Digest 1995, "Optical Interference Coatings", Wolfe et al., vol. 17, pp. 115–117 (no month).
U.S patent application Ser. No. 09/778,949, filed Feb. 8, 2001.
U.S. patent application Ser. No. 09/455,026, filed Dec. 6, 1999.
Fan et al., "Transparent heat mirrors for solar–energy applications," Applied Optics, vol. 15, No. 4, Apr. 1976.

(List continued on next page.)

*Primary Examiner*—Deborah Jones
*Assistant Examiner*—Jennifer McNeil
(74) *Attorney, Agent, or Firm*—Nixon & Vanderhye P.C.

(57) ABSTRACT

A heat treatable coated article including an infrared (IR) reflecting layer (e.g., of or including Ag), the coated article being able to attain a $\Delta E^*$ (glass side) no greater than about 3.0, more preferably no greater than 2.5, and even more preferably no greater than 2.0, following or due to heat treatment (e.g., thermal tempering). Accordingly, low-E (i.e., low emissivity) coated articles of certain embodiments of this invention appear from the glass side thereof visually similar to the naked eye both before and after heat treatment. Coated articles herein may be used in the context of insulating glass (IG) window units, vehicle windshields, or any other suitable applications. In certain embodiments of this invention, an exemplary layer stack includes: glass/$Si_3N_4$/NiCr/Ag/NiCr/$Si_3N_4$. Other materials may instead be used without departing from the scope and/or spirit of the instant invention which is a low-E matchable product.

33 Claims, 1 Drawing Sheet

U.S. PATENT DOCUMENTS

| | | |
|---|---|---|
| 4,680,742 A | 7/1987 | Yamada et al. |
| 4,715,879 A | 12/1987 | Schmitte et al. |
| 4,769,291 A | 9/1988 | Belkind et al. |
| 4,780,370 A | 10/1988 | Tracy et al. |
| 4,790,922 A | 12/1988 | Huffer |
| 4,799,745 A | 1/1989 | Meyer et al. |
| 4,806,220 A | 2/1989 | Finley |
| 4,816,034 A | 3/1989 | Bhatt et al. |
| 4,826,525 A | 5/1989 | Chesworth et al. |
| 4,857,094 A | 8/1989 | Groth et al. |
| 4,898,789 A | 2/1990 | Finley |
| 4,898,790 A | 2/1990 | Finley |
| 4,948,482 A | 8/1990 | Kobayashi et al. |
| 4,954,232 A | 9/1990 | Yamada et al. |
| 4,965,121 A | 10/1990 | Young et al. |
| 5,028,759 A | 7/1991 | Finley |
| 5,059,295 A | 10/1991 | Finley |
| 5,062,937 A | 11/1991 | Komuro |
| 5,188,887 A | 2/1993 | Linge et al. |
| 5,229,194 A | 7/1993 | Lingle et al. |
| 5,242,560 A | 9/1993 | Lingle et al. |
| 5,270,517 A | 12/1993 | Finley |
| 5,344,718 A | 9/1994 | Hartig et al. |
| 5,376,455 A | 12/1994 | Hartig et al. |
| 5,377,045 A | 12/1994 | Wolfe et al. |
| 5,403,458 A | 4/1995 | Hartig et al. |
| 5,514,476 A | 5/1996 | Hartig et al. |
| 5,521,765 A | 5/1996 | Wolfe |
| 5,543,229 A | 8/1996 | Ohsaki et al. |
| 5,557,462 A | 9/1996 | Hartig et al. |
| 5,563,734 A | 10/1996 | Wolfe et al. |
| 5,688,585 A | 11/1997 | Lingle et al. |
| 5,770,321 A | 6/1998 | Hartig et al. |
| 5,800,933 A | 9/1998 | Hartig et al. |
| 5,837,108 A | 11/1998 | Lingle et al. |
| 5,902,505 A | 5/1999 | Finley |
| 5,942,338 A | 8/1999 | Arbab et al. |
| 6,014,872 A | 1/2000 | Hartig et al. |
| 6,059,909 A | 5/2000 | Hartig et al. |
| 6,132,881 A | 10/2000 | Hartig et al. |
| 6,159,607 A | 12/2000 | Hartig et al. |

FOREIGN PATENT DOCUMENTS

| | | |
|---|---|---|
| EP | 0567735 | 11/1993 |
| EP | 0622645 | 11/1994 |
| EP | 0717014 | 6/1996 |
| EP | 0722913 | 7/1996 |
| EP | 0747329 | 12/1996 |
| GB | 2279365 | 1/1995 |
| WO | 9002653 | 3/1990 |
| WO | 9005439 | 5/1990 |
| WO | 9008334 | 7/1990 |
| WO | 9403331 | 2/1994 |
| WO | 9513189 | 5/1995 |

OTHER PUBLICATIONS

Fan et al., "Transparent heat–mirror films of $TiO_2/Ag/TiO_2$ for solar energy collection and radiation insulation," Appl. Physics Letters, vol. 25, No. 12, Dec. 15, 1974.

Airco Super –E III Coating Process Release, no date.

Airco Super –E IV Technology Process Release, p. 1–23, no date.

1991 Proposed ASTM Standard Test Method for Measuring and Calculating Emittance of Architectural Flat Glass Products Using Radiometric Measurements, no date.

ASTM Designation: E 424–71 Standard Test Methods for Solar Energy Transmittance and Reflectance (Terrestrial) of Sheet Materials.

"Principles of Design of Architectural Coatings", Applied Optics vol. 22, No. 24, Dec. 15, 1983.

"Performance and Sputtering Criteria of Modern Architectural Glass Coatings" SPIE vol. 325, Optical Thin Films (1982).

EPO Search Report, EP 96 10 4113 (no date).

LOW-E MATCHABLE COATED ARTICLES AND METHODS OF MAKING SAME

This is a continuation-in-part (CIP) of commonly owned U.S. patent application Ser. No. 09/455,026, filed Dec. 6, 1999.

This invention relates to low-E coated articles that have approximately the same color characteristics as viewed by the naked eye both before and after heat treatment (e.g., thermal tempering), and corresponding methods. Such coated articles may be used in insulating glass (IG) units, windshields, and other suitable applications.

BACKGROUND OF THE INVENTION

Solar control coating systems are known. For example, commonly owned U.S. Pat. No. 5,688,585 discloses a solar control coated article including: glass/$Si_3N_4$/NiCr/$Si_3N_4$. One object of the '585 patent is to provide a sputter coated layer system that after heat treatment is matchable colorwise with its non-heat treated counterpart. While the coating systems of the '585 patent are excellent for their intended purposes, they suffer from certain disadvantages. In particular, they tend to have rather high emissivity values (e.g., because no silver (Ag) layer is disclosed in the '585 patent).

Low-emissivity (low-E) coating systems are also known in the art. For example, commonly owned U.S. Pat. No. 5,376,455 discloses: glass/$Si_3N_4$/NiCr/Ag/NiCr/$Si_3N_4$. Low-E coating systems such as this are typically designed for maximum visible transmission. For this reason, the NiCr layers are made rather thin. This enables high transmission and low-E characteristics, but less than desirable solar control (e.g., shading coefficient) characteristics. Thus, the low-E coating system of the '455 patent is unfortunately not sufficiently color matchable after heat treatment with its non-heat treated counterpart, and lacks superior solar control characteristics such as shading coefficient (SC).

Accordingly, when it is desired to provide an insulating glass (IG) unit with both low emissivity (low-E) and solar control characteristics, it has often been necessary to combine the solar control coating of the '585 patent with the low-E coating of the '455 patent in a single IG unit. For example, the solar control coating of the '585 patent is placed on the #2 surface of the IG unit while the low-E coating of the '455 patent is placed on the #3 surface of the IG unit. The need for these two separate and distinct coatings in an IG unit is undesirable, for cost, processing and/or performance reasons.

The need for matchability (before heat treatment vs. after heat treatment) is also known. Glass substrates are often produced in large quantities and cut to size in order to fulfill the needs of a particular situation such as a new multi-window and door office building, vehicle windshield needs, etc. It is often desirable in such applications that some of the windows and/or doors be heat treated (i.e., tempered, heat strengthened or bent) while others need not be. Office buildings often employ IG units and/or laminates for safety and/or thermal control. It is desirable that the units and/or laminates which are heat treated substantially match their non-heat treated counterparts (e.g., with regard to color, reflectance, and/or the like, at least on the glass side) for architectural and/or aesthetic purposes. In addition, it is sometimes desirable that certain windows, doors, windshields, etc. be of a substantially neutral color, preferably tending to the blue-green side of the spectrum.

It has in the past been possible to achieve matchability in systems other than those of the aforesaid '585 patent, but only between two different layer systems, one of which is heat treated and the other is not. The necessity of developing and using two different layer systems to achieve matchability creates additional manufacturing expense and inventory needs which are undesirable.

U.S. Pat. Nos. 6,014,872 and 5,800,933 (see Example B) disclose a heat treatable low-E layer system including: glass$TiO_2$/$Si_3N_4$/NiCr/Ag/NiCr/$Si_3N_4$. Unfortunately, when heat treated this low-E layer system is not approximately matchable colorwise with its non-heat treated counterpart (as viewed from the glass side). This is because this low-E layer system has a $\Delta E^*$ (glass side) value of greater than 4.1 (i.e., for Example B, $\Delta a^*_G$ is 1.49, $\Delta b^*_G$ is 3.81, and $\Delta L^*$ (glass side) is not measured; using Equation (1) below then $\Delta E^*$ on the glass side must necessarily be greater than 4.1 and is probably much higher than that).

In view of the above, it will be apparent to those skilled in the art that there exists a need for a coating or layer system that could satisfy both solar control and low-E requirements (e.g., so a solar control coating and a separate low-E coating need not be used together on different surfaces of the same IG unit). In addition to and/or instead of the above need, there also exists a need in the art for a low-E coating or layer system which after heat treatment substantially matches in color and/or reflection (as viewed by a naked human eye from the glass side) its non-heat treated counterpart. In other words, there exists a need in the art for a low-E matchable coating or layering system.

It is a purpose of this invention to fulfill any and/or all of the above-listed needs, and/or other needs which will become more apparent to the skilled artisan once given the following disclosure.

SUMMARY OF THE INVENTION

An object of this invention is to provide a low-E coating or layer system that has good color stability with heat treatment.

Another object of this invention is to provide a low-E matchable coating or layering system.

Another object of this invention is to provide a coating or layer system that has improved IR reflectance characteristics relative to those of the coating systems described in U.S. Pat. No. 5,688,585.

Another object of certain embodiments of this invention is to provide improved solar control characteristics (e.g., low shading coefficient and/or visible transmittance) relative to those of the '455 patent.

Another object of this invention is to provide a coating or layer system that when heat treated is substantially matchable to its non-heat treated counterpart.

Another object of this invention is to fulfill one or more of the above-listed objects.

It has been surprisingly found that silver in rather substantial thicknesses may be employed while still achieving color stability with heat treatment (e.g., thermal tempering, bending, or heat strengthening). The layer systems of the invention may be utilized, for example, in the context of IG units, vehicle windows and windshields, or the like.

According to certain exemplary embodiments of this invention, one or more of the above-listed objects or needs is/are fulfilled by providing a coated article comprising:

a layer system supported by a glass substrate, said layer system comprising an infrared (IR) reflecting silver layer located between first and second dielectric layers; and wherein said coated article has a ΔE* value (glass side, reflectance) no greater than 3.0 (more preferably no greater than 2.5) after or due to heat treatment.

Further embodiments of this invention fulfill one or more of the above-listed needs or objects by providing a coated article comprising:

a substrate;

a layer system provided on the substrate, said layer system comprising from the glass outwardly, a first silicon nitride inclusive layer, a first Ni or NiCr inclusive layer, an IR reflecting metal layer, a second Ni or NiCr inclusive layer, and a second silicon nitride inclusive layer;

wherein each of said first and second Ni or NiCr inclusive layers is at least about 20 Å A thick; and wherein said coated article has a hemispherical emissivity ($E_h$) of no greater than 0.25 before heat treatment, a sheet resistance $R_s$ no greater than 20 ohms/square before heat treatment, and a ΔE* value (glass side, reflectance) no greater than 2.5 after or due to heat treatment.

Other embodiments of this invention fulfill one or more of the above-listed needs or objects by providing a method of making a coated article, the method comprising:

depositing a layer system on a glass substrate, the layer system including an infrared (IR) reflecting metal layer located between first and second dielectric layers, wherein prior to heat treatment the glass substrate with the layer system thereon has a sheet resistance $R_s$ no greater than 20 ohms/square; and heat treating the substrate with the layer system thereon so that due to said heat treating the resulting substrate with the layer system thereon has a ΔE* value (glass side; reflectance) no greater than 2.5.

Other embodiments of this invention fulfill one or more of the above-listed needs or objects by providing a an insulating glass (IG) window unit comprising:

first and second glass substrates sealed together proximate their respective peripheral edges so as to form an insulating space therebetween;

a layer system supported by one of said glass substrates proximate said insulating space, said layer system comprising an infrared (IR) reflecting silver layer located between first and second dielectric layers; and wherein said IG unit has a ΔE* value (exterior or outside) no greater than 3.0 after or due to heat treatment.

This invention will now be described with respect to certain embodiments thereof as illustrated in the following drawings, wherein:

DETAILED DESCRIPTION OF CERTAIN EXEMPLARY EMBODIMENTS OF THE INVENTION

Certain embodiments of this invention provide a coating or layer system that may be used in applications such as IG units, vehicle windows, vehicle windshields, and other suitable applications. Certain embodiments of this invention provide a layer system that has excellent color stability (i.e., a low value of ΔE* and/or a low value of Δa*; where Δ is indicative of change in view of heat treatment) with heat treatment (e.g., thermal tempering, bending, or thermal heat strengthening) both monolithically and in the context of dual pane environments such as IG units or windshields. Such heat treatments often necessitate heating the coated substrate to temperatures above 1100° F. (593° C.) and up to 1450° F. (788° C.) [more preferably from about 1100 to 1200 degrees F.] for a sufficient period of time to insure the end result (e.g., tempering, bending, and/or heat strengthening). Certain embodiments of this invention combine both (i) color stability with heat treatment, and (ii) the use of a silver layer for selective IR reflection. Certain embodiments of this invention combine (i) and (ii), along with (iii) color in the blue-green quadrant (i.e., third quadrant) of the color spectrum when applied to a clear and/or green glass substrate. Certain embodiments of this invention combine (i), (ii) and (iii), along with (iv) low-emissivity characteristics.

Figure 1:
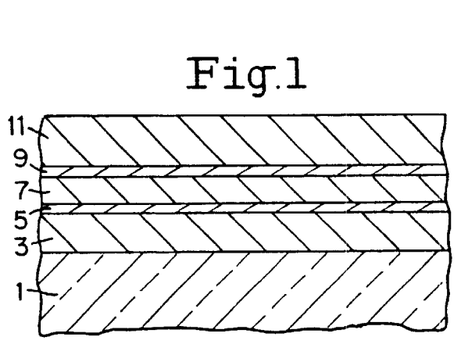
FIG. 1 is a partial side cross sectional view of an embodiment of a layer system according to this invention.

FIG. 1 is a side cross sectional view of a coated article according to an embodiment of this invention. The coated article includes substrate 1 (e.g., clear, green, bronze, grey, blue, or blue-green glass substrate from about 1.0 to 12.0 mm thick), first dielectric layer 3 (e.g., of or including silicon nitride (e.g., $Si_3N_4$), titanium dioxide, titanium nitride, zirconium oxide, zirconium nitride, tin oxide, silicon oxide, silicon dioxide, silicon oxynitride, or zinc oxide), nickel (Ni) or nickel-chrome (NiCr) inclusive layer 5 (other oxidation resistant materials may be used instead of Ni or NiCr in alternative embodiments of this invention), IR reflecting silver (Ag) inclusive layer 7, nickel (Ni) or nickel-chrome (NiCr) inclusive layer 9 (other oxidation resistant materials may be used instead of Ni or NiCr in alternative embodiments of this invention), and second dielectric layer 11 (e.g., of or including silicon nitride (e.g., $Si_3N_4$), titanium dioxide, titanium nitride, zirconium nitride, zirconium oxide, tin oxide, silicon oxide, silicon dioxide, silicon oxynitride, or zinc oxide). Other layer(s) below or above the illustrated coating system may also be provided. Thus, while the layer system is "on" or "supported by" substrate 1 (directly or indirectly), other layer(s) may be provided therebetween. Thus, for example, the layer system of FIG. 1 may be considered "on" the substrate 1 even though other layer(s) are provided therebetween.

IR reflecting Ag layer 7 is preferably Ag metal, although it is possible that some small amount of oxidation could occur with respect thereto. The same is true for Ni or NiCr layers 5 and 9 Thus, in certain preferred embodiments of this invention, layers 5, 7 and 9 are no more than about 25% oxidized, more preferably no more than about 10% oxidized, and most preferably no more than 1% oxidized. In certain preferred embodiments, layers 5 and/or 9 are of non-nitrided and nonoxidized nickel or nickel alloy (e.g., nichrome of, by weight percent, 80/20 nickel/chrome). An exemplary apparatus which may be used to form the layer coating systems of this invention is a conventional sputter coating system, such as the multichamber G-49 large area flat glass sputter coater produced by Airco, Inc.

In embodiments of this invention where layers 3 and 11 comprise $Si_3N_4$, a target including Si employed to form these layers may be admixed with up to 6–20% by weight aluminum or stainless steel (e.g. SS#316), with about this amount then appearing in the layers so formed. Moreover, while layers 5 and 9 may be metallic nickel, a nichrome preferably consisting essentially of, by weight about 80–90% Ni and 10–20% Cr, may be employed in certain preferred embodiments. Other metals or alloys may also be used in alternative embodiments, e.g., alloy(s) include 10% or more Ni. Moreover, while it is possible to employ certain other IR reflecting metals as layer 7, such as gold or platinum in certain embodiments of this invention, layer 7 herein consists essentially of metallic silver in certain embodiments of this invention. An example of layers 5 and 9 includes not only SS-316 which consists essentially of 10% Ni and 90% other ingredients, mainly Fe and Cr, but Haynes 214 alloy as well, which by weight consists essentially of (as a nominal composition):

| Element | Weight % |
| --- | --- |
| Ni | 75.45 |
| Fe | 4.00 |
| Cr | 16.00 |
| C | .04 |
| Al | 4.50 |
| Y | .01 |

In other embodiments of this invention, coated articles may be as follows: glass/silicon nitride/nichrome/silver/nichrome/silver/nichrome/silicon nitride. In such embodiments, the respective silicon nitride, nichrome and/or silver layers may have thicknesses similar to those discussed for these materials in other embodiments of this invention. Alternatively, certain layers may be thinner, for example as follows: glass/silicon nitride (40 Å)/nichrome(35 Å)/silver (50 Å)/nichrome(30 Å)/silver(50 Å)/nichrome(35 Å)/silicon nitride(261 Å). It is believed that these dual silver embodiments may experience improved color stability and/or chemical resistance characteristics relative to the FIG. 1 embodiment as described herein. This embodiment may even experience better durability than the FIG. 1 embodiment in certain instances.

Figure 2:
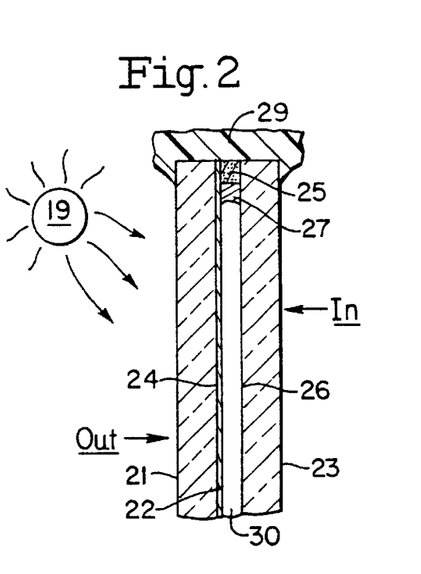
FIG. 2 is a partial cross-sectional view of an IG unit as contemplated by this invention, in which the layer system of FIG. 1 may be used.

FIG. 2 illustrates the coating or layer system 22 of FIG. 1 (or of the aforesaid dual silver embodiment) being utilized on surface #2 of an IG window unit. In order to differentiate the "inside" of the IG unit from its "outside", the sun 19 is schematically presented on the outside. The IG unit includes outside glass pane or sheet 21 and inside glass pane or sheet 23 These two glass substrates (e.g. float glass 2 mm to 12 mm thick) are sealed at their peripheral edges by a conventional sealant 25 and are provided with a conventional desiccant strip 27 The panes are then retained in a conventional window or door retaining frame (shown in partial schematic form). By sealing the peripheral edges of the glass sheets and replacing the air in insulating space (or chamber) 30 with a gas such as argon, a typical, high insulating value IG unit is formed. Optionally, insulating space 30 may be at a pressure less than atmospheric pressure in certain alternative embodiments, although this of course is not necessary in all embodiments. Either inner wall 24 or 26 (or both) may be provided with a layer system (see FIG. 1) of this invention. In this illustrated embodiment of FIG. 2, inner wall 24 (i.e., surface #2) of outside glass sheet 21 has been provided with a sputter-coated layer system of FIG. 1 thereon.

Turning back to FIG. 1, while various thicknesses may be used consistent with one or more of the objects and/or needs discussed herein, according to certain exemplary embodiments of this invention, the preferred thicknesses and materials for the respective layers on the glass substrate 1 are as follows:

TABLE 1

| Layer | (Thicknesses) | |
| --- | --- | --- |
| | Preferred Range (Å) | More Preferred (Å) |
| $Si_3N_4$ (layer 3) | 300–380 Å | 320–360 Å |
| NiCr (layer 5) | 20–150 Å | 20–90 Å |
| Ag (layer 7) | 40–120 Å | 60–80 Å |
| NiCr (layer 9) | 20–150 Å | 20–90 Å |
| $Si_3N_4$ (layer 11) | 400–500 Å | 420–480 Å |

As can be seen from Table 1 above, the upper Ni or NiCr layer 9 has been substantially thickened relative to embodiments of the aforesaid '455 patent. Moreover, dielectric layer(s) 3 and/or 11 has/have been thinned relative to the '455 patent. Surprisingly, it is believed that one or more of these changes results in the matchability or lower $\Delta E^*$ values (to be described below) associated with certain embodiments of this invention (i.e., improved stability with heat treatment). One or both of these changes may also be associated with improved durability experienced by certain embodiments of this invention. Also, it is noted that these embodiments represent a significant improvement over the '585 patent because the instant inventor has found a way to (i) use an Ag layer to reflect IR so as to achieve a low-E layer system, and at the same time (ii) have good stability with heat treatment (i.e., a low $\Delta E^*$ and/or $\Delta a^*$ value(s)). This combination of a low-E system with good stability with heat treatment is believed novel and inventive.

In certain exemplary embodiments, the stability with heat treatment results in substantial matchability between heat treated and non-heat treated versions of the coating or layer system. In other words, in monolithic and/or IG applications, in certain embodiments of this invention two glass substrates having the same coating system thereon (one heat treated after deposition and the other not heat treated) appear to the naked human eye to look substantially the same when viewed from the glass side of the product (i.e. looking through at least one substrate of glass before viewing the coating). In certain embodiments of this invention it has also been found that matchability (while achievable in monolithic applications) may even be improved in IG and/or laminate applications.

Thus, in certain embodiments, matchability is achieved monolithically. However, other embodiments only achieve matchability when used in a dual or multi-glass substrate structure such as an IG unit. The matchability improvement in an IG unit occurs due to moderating effect of the inside glass pane 26 (FIG. 2). Light reflected from the inside pane 26 approximately adds up to the light reflected from the outside pane 21. Consequently, perceived IGU color in reflection is some weighted average of colors reflected from the individual panes 21 and 26 The impact of each pane on the resulting color will stay in some proportion to the percentage of light reflected from each pane and reaching viewers eye. Considering the outside observer, the light reflected from the outside pane 21 will reach viewers eye without obstruction. However, the light reflected from the inside pane 26 will have to go through the front pane twice (once before being reflected from the inside pane and once after) before reaching the same viewer's eye. In effect, the amount of light reflected from the inside pane will be reduced by a factor equal to the squared transmittance of the outside pane. For that reason, moderating effect of the inside pane will be diminishing quickly with decreasing visible transmittance of the front pane 21. The diminishing effect will be even greater due to the fact that, typically, the reflectance of the coated pane 21 will be increasing as the transmittance decreases, thus further increasing the percentage of the light reflected from the front pane in the light reflected from the IG unit. For example, the coated product described in the mentioned patent application Ser. No. 09/455,026 in the annealed state had visible transmittance about 70% and the glass side reflectance about 10%. The transmittance was increasing to about 75% while glass side reflectance was decreasing to about 8% for the heat treated product. The total outside reflectance for the heat treated IG unit will be 8% from the front pane, and 8% (reflectance of uncoated glass)*$0.75^2$=4.5%. Thus, the light reflected from the inside pane 26 amounts to 36% of the total outside reflectance from the heat treated IG unit. That means, that the IG unit $\Delta E^*_{IGU}$ will be reduced by about 36% as compared to the monolithic $\Delta E^*_{mono}$. It has been determined (Patent application Ser. No. 09/455,026, pages 39 and 40) that due to about 5% transmittance increase during heat treatment, the actual moderating effect was even greater (about 55%, measured $\Delta E^*_{mono}$=3.95, $\Delta E^*_{IGU}$=1.76). In contrast, the moderating effect for the lower transmittance coated products such as Example #2 this patent application, will be almost nonexistent. For the heat treated IG unit, the outside reflectance from the front pane 21 was 16.51%. The transmittance of the heat treated front pane was 44.91. The total outside reflectance from the IG unit as shown at FIG. 2 may be calculated as 16.51% from the front pane 21, and 8%*$0.45^2$=1.62% from the inside pane 26. In this case, the light from the inside pane 26 will be only about 9% of the total IG unit reflectance and the expected moderating effect on $\Delta E^*$ will be about 9%. The additional moderating effect due to transmittance increase in heat treatment will also be very small in this case since transmittance increase is very small ($\Delta T$=0.72%). The consideration proves, that for the lower transmittance coatings, to achieve matchability in an IG unit, the matchability must be practically achieved for the coated front pane 21 in the monolithic state. Thus, in certain embodiments, generally these with transmittance higher than 60%, the $\Delta E$ of the monolithic (individual) substrate may be substantially higher than 2.5 and matchability still be achieved in the dual or multipane articles of this invention. However, in certain other embodiments, generally those with transmittance lower than 60%, the $\Delta E$ of the monolithic (individual) substrate may not be substantially higher than 2.5, preferably lower than 2.5, in order to achieve matchability in the dual or multipane articles of this invention. In the Examples #1–4, $\Delta E^*$ values are reduced by 0.5–0.8 points for the higher transmittance samples (#1 and #3), and by 0.2–0.3 points for the lower transmittance samples (#2 and #4).

The values $\Delta E^*$ and $\Delta a^*$ are important in determining whether or not there is matchability, or substantial matchability, in the context of this invention. Color herein is described by reference to the conventional a*, b* values, which in certain embodiments of this invention are both negative in order to provide color in the desired substantially neutral color range tending to the blue-green quadrant. The term $\Delta a^*$ is simply indicative of how much color value a* changes due to heat treatment.

The term $\Delta E^*$ (and $\Delta E$) is well understood in the art and is reported, along with various techniques for determining it, in ASTM 2244-93 as well as being reported in Hunter et. al., *The Measurement of Appearance*, $2^{nd}$ Ed. Cptr. 9, page 162 et seq. [John Wiley & Sons, 1987]. As used in the art, $\Delta E^*$ (and $\Delta E$) is a way of adequately expressing the change (or lack thereof) in reflectance and/or transmittance (and thus color appearance, as well) in an article after or due to heat treatment. $\Delta E$ may be calculated by the "ab" technique, or by the Hunter technique (designated by employing a subscript "H"). $\Delta E$ corresponds to the Hunter Lab L, a, b scale (or $L_h$, $a_h$, $b_h$). Similarly, $\Delta E^*$ corresponds to the CIE LAB Scale L*, a*, b*. Both are deemed useful, and equivalent for the purposes of this invention. For example, as reported in Hunter et. al. referenced above, the rectangular coordinate/scale technique (CIE LAB 1976) known as the L*, a*, b* scale may be used, wherein:

L* is (CIE 1976) lightness units a* is (CIE 1976) red-green units b* is (CIE 1976) yellow-blue units and the distance $\Delta E^*$ between $L^*_o a^*_o b^*_o$ and $L^*_1 a^*_1 b^*_1$ is:

$$\Delta E^* = [(\Delta L^*)^2 + (\Delta a^*)^2 + (\Delta b^*)^2]^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (coated article) before heat treatment and the subscript "1" represents the coating (coated article) after heat treatment; and the numbers employed (e.g., a*, b*, L*) are those calculated by the aforesaid (CIE LAB 1976) L*, a*, b* coordinate technique. In a similar manner, $\Delta E$ may be calculated using equation (1) by replacing a*, b*, L* with Hunter Lab values $a_h$, $b_h$, $L_h$. Also within the scope of this invention and the quantification of $\Delta E^*$ are the equivalent numbers if converted to those calculated by any other technique employing the same concept of $\Delta E^*$ as defined above.

In certain embodiments of this invention, layer systems herein provided on clear monolithic glass substrates have color as follows before heat treatment, as viewed from the glass side of the coated article ($R_G$%):

TABLE 2

| Color ($R_G$) Before Heat Treatment | | |
|---|---|---|
| | General | Preferred |
| a* | 0.0 to –5.0 | 0.0 to –3.0 |
| b* | –1.0 to –10.0 | –3.0 to –9.0 |

After heat treatment, in certain embodiments of this invention layer systems provided on clear monolithic glass substrates have color characteristics $\Delta E^*$ and $\Delta a^*$ as follows, when viewed from the glass (G) side (as opposed to the layer side) of the coated article:

TABLE 3

| Color Characteristics ($\Delta E^*_G$ & $\Delta a^*_G$) After Heat Treatment | | |
|---|---|---|
| | General | Preferred |
| $\Delta E^*_G$ is | <=3.0 | <=2.5 (or <=2.0) |
| $\Delta a^*_G$ is | <=1.0 | <=0.8 |

Accordingly, as shown in Table 3 above, coated articles according to certain embodiments of this invention have a $\Delta E^*$ value (glass side) of no greater than 3.0, more preferably no greater than 2.5, and even more preferably no greater than 2.0; and have a Δa* value (glass side) of no greater than about 1.0, more preferably no greater than 0.8. When one or both of these are achieved, matchability may result. It is noted that b* values are not deemed as important as a* values, because a* changes are believed to be more noticeable to the naked human eye than are b* changes in certain instances.

EXAMPLES 1–4

The following four Example coated articles (each annealed and heat treated) were made in accordance with certain embodiments of this invention. For each of the four Examples, the layer system was: glass/$Si_3N_4$/NiCr/Ag/NiCr/$Si_3N_4$ (e.g., see FIG. 1). For each of these Examples, the substrate was of substantially clear 5.6–6.0 mm thick soda-lime-silica glass. The coater/process setups for the four Examples were as follows.

With regard to Examples 1–2, they were made using a G-49 large area flat glass sputter coater produced by Airco, Inc., using line speed of 170 IPM, with coat zones 3–5 being used; where "*" means Al content of approximately 10% and gas (e.g., Ar, $N_2$) flow was measured in sccm units. All targets for Examples 1–2 were C-Mag targets, except that the targets used for depositing the Ag and NiCr layers (target #s 19–21) were planar. Moreover, in Examples 1–2 the first silicon nitride layer was deposited in coat zone 3 using AC power, the NiCr and Ag layers were deposited in coat zone 4 using DC power, and the overcoat silicon nitride layer was deposited in coat zone 5 using AC power. The coater was set up and ran as follows during the sputtering of Examples 1–2:

TABLE 4

Coater Setup/Processes for Examples 1–2

| Cathode | Target | Power (kW) | Voltage (V) | Pressure (mTorr) | Ar flow | $N_2$ flow |
|---|---|---|---|---|---|---|
| EXAMPLE #1 | | | | | | |
| #13 | Si/Al* | 27.7 | 444 | 2.5 | 551 | 1489 |
| #14 | Si/Al* | 27.7 | 451 | 2.5 | 551 | 1489 |
| #15 | Si/Al* | 27.7 | 459 | 2.5 | 551 | 1489 |
| #16 | Si/Al* | 27.7 | 481 | 2.5 | 551 | 1489 |
| #17 | Si/Al* | 27.7 | 453 | 2.5 | 551 | 1489 |
| #18 | Si/Al* | 27.7 | 480 | 2.5 | 551 | 1489 |
| #19 | NiCr | 10.5 | n/a | 2.7 | 1110 | 0 |
| #20 | Ag | 4.15 | n/a | 2.7 | 1110 | 0 |
| #21 | NiCr | 10.5 | n/a | 2.7 | 1110 | 0 |
| #22 | Si/Al* | 33.6 | 465 | 2.5 | 541 | 1336 |
| #23 | Si/Al* | 33.6 | 462 | 2.5 | 541 | 1336 |
| #24 | Si/Al* | 33.6 | 452 | 2.5 | 541 | 1336 |
| #25 | Si/Al* | 33.6 | 456 | 2.5 | 541 | 1336 |
| #26 | Si/Al* | 33.6 | 478 | 2.5 | 541 | 1336 |
| #27 | Si/Al* | 33.6 | 463 | 2.5 | 541 | 1336 |
| EXAMPLE #2 | | | | | | |
| #13 | Si/Al* | 27.7 | 444 | 2.5 | 551 | 1489 |
| #14 | Si/Al* | 27.7 | 451 | 2.5 | 551 | 1489 |
| #15 | Si/Al* | 27.7 | 459 | 2.5 | 551 | 1489 |
| #16 | Si/Al* | 27.7 | 481 | 2.5 | 551 | 1489 |
| #17 | Si/Al* | 27.7 | 453 | 2.5 | 551 | 1489 |
| #18 | Si/Al* | 27.7 | 480 | 2.5 | 551 | 1489 |
| #19 | NiCr | 17.0 | n/a | 2.7 | 1110 | 0 |
| #20 | Ag | 4.15 | n/a | 2.7 | 1110 | 0 |
| #21 | NiCr | 17.0 | n/a | 2.7 | 1110 | 0 |
| #22 | Si/Al* | 33.6 | 465 | 2.5 | 541 | 1336 |
| #23 | Si/Al* | 33.6 | 462 | 2.5 | 541 | 1336 |
| #24 | Si/Al* | 33.6 | 452 | 2.5 | 541 | 1336 |
| #25 | Si/Al* | 33.6 | 456 | 2.5 | 541 | 1336 |
| #26 | Si/Al* | 33.6 | 478 | 2.5 | 541 | 1336 |
| #27 | Si/Al* | 33.6 | 463 | 2.5 | 541 | 1336 |

Examples 3–4 were made using a Leybold TG-1 sputter coater using line speed of 4 m/min.; where "*" again means aluminum (Al) target content of approximately 10% and gas (e.g., Ar, $N_2$) flow was measured in sccm units. Target #s 34, 42, 55 and 61 were 2×C-Mag targets, target #s 44, 51 and 53 were planar targets, and target #65 was a Twin-Mag target. Pressure was measured in mTorr. The coater was set up and ran as follows during the sputtering of Examples 3–4:

TABLE 5

Coater Setup/processes for Examples 3–4

| Cathode | Target | Power (kW) | Voltage (V) | Pressure | Ar flow | $N_2$ flow | Freq. (kHz) |
|---|---|---|---|---|---|---|---|
| EXAMPLE #3 | | | | | | | |
| #34 | Si/Al* | 64.5 | 395 | 3.6 | 203 | 452 | 28.1 |
| #42 | Si/Al* | 64.5 | 341 | 3.1 | 200 | 452 | 28.7 |
| #44 | NiCr | 12.5 | 385 | 2.5 | 220 | 0 | DC |
| #51 | Ag | 4.55 | 466 | 2.3 | 315 | 0 | DC |
| #53 | NiCr | 12.5 | 421 | 2.4 | 220 | 0 | DC |
| #55 | Si/Al* | 62 | 373 | 3.5 | 200 | 447 | 27.8 |
| #61 | Si/Al* | 64 | 374 | 4.5 | 200 | 447 | 28.1 |
| #65 | Si/Al* | 62 | 326 | 3.5 | 200 | 377 | 27.8 |
| EXAMPLE #4 | | | | | | | |
| #34 | Si/Al* | 64.5 | 395 | 3.6 | 203 | 452 | 28.1 |
| #42 | Si/Al* | 64.5 | 341 | 3.1 | 200 | 452 | 28.7 |
| #44 | NiCr | 19 | 347 | 2.5 | 220 | 0 | DC |
| #51 | Ag | 4.55 | 466 | 2.3 | 315 | 0 | DC |
| #53 | NiCr | 19 | 379 | 2.4 | 220 | 0 | DC |
| #55 | Si/Al* | 62 | 373 | 3.5 | 200 | 447 | 27.8 |
| #61 | Si/Al* | 64 | 374 | 4.5 | 200 | 447 | 28.1 |
| #65 | Si/Al* | 62 | 326 | 3.5 | 200 | 377 | 27.8 |

After being sputtered onto a glass substrate as set forth above, Examples 1–4 were tested and were found to have the following characteristics monolithically (not in a IG unit), where the heat treatment was thermally tempering the monolithic product in a conventional tempering furnace at approximately 1265° F. for three minute cycles and quenching to room temperature (note: a* and b* color coordinate values are in accordance with CIE LAB 1976, Ill. CIE-C 2 degree observer technique)

TABLE 6

Characteristics of Examples 1–4 (Monolithic)

| Value/Measurement | Before Heat Treatment | After Heat Treatment |
|---|---|---|
| EXAMPLE #1 | | |
| Transmission (TY) %: | 56.36 | 59.21 |
| $L^*_T$: | 79.82 | 81.41 |
| $a^*_T$: | −3.14 | −3.27 |
| $b^*_T$: | −3.93 | −4.68 |
| Reflectance as viewed from glass (G) side: $R_GY$ (%): | 12.68 | 11.52 |

TABLE 6-continued

Characteristics of Examples 1–4 (Monolithic)

| Value/Measurement | Before Heat Treatment | After Heat Treatment |
|---|---|---|
| $L^*_G$: | 42.27 | 40.44 |
| $a^*_G$: | −1.95 | −1.53 |
| $b^*_G$: | −6.72 | −7.06 |
| $\Delta E^*$ (i.e., from glass (G) side): | | 1.9 |
| $\Delta a^*_G$ (absolute value): | | 0.42 |
| Reflectance as viewed from film/coating (F) side: $R_FY$ (%): | 2.71 | 2.78 |
| $L^*_F$: | 18.86 | 19.12 |
| $a^*_F$: | 11.58 | 12.73 |
| $b^*_F$: | 0.28 | −1.59 |
| $R_s$ (sheet resistance in ohms/sq.) | 12.0 | 10.8 |
| Total Solar T %: | 38 | |
| Solar $R_{out}$: | 16 | |
| U Value: | 0.74 | |
| U Value S: | 0.69 | |
| Shading Coefficient (SC): | 0.54 | |
| SHGC: | 0.463 | |
| Heat Gain: | 117 | |
| $E_h$ (hemispherical emissivity): | 0.176 | |
| EXAMPLE #2 | | |
| Transmission (TY) %: | 44.19 | 44.91 |
| $L^*_T$: | 72.36 | 72.83 |
| $a^*_T$: | −3.68 | −3.2 |
| $b^*_T$: | −5.82 | −6.3 |
| Reflectance as viewed from glass (G) side: $R_GY$ (%): | 17.05 | 16.51 |
| $L^*_G$: | 48.33 | 47.64 |
| $a^*_G$: | −1.26 | −1.37 |
| $b^*_G$: | −3.09 | −3.37 |
| $\Delta E^*$ (i.e., glass (G) side): | | 0.8 |
| $\Delta a^*_G$ (absolute value): | | 0.11 |
| Reflectance as viewed from film/coating (F) side: $R_FY$ (%): | 4.6 | 4.63 |
| $L^*_F$: | 25.55 | 25.66 |
| $a^*_F$: | 15.09 | 13.7 |
| $b^*_F$: | 11.73 | 14.62 |
| $R_s$ (sheet resistance in ohms/sq.) | 11.3 | 10.6 |
| Total Solar T %: | 29 | |
| Solar $R_{out}$: | 20 | |
| U Value: | 0.74 | |
| U Value S: | 0.70 | |
| Shading Coefficient (SC): | 0.45 | |
| SHGC: | 0.385 | |
| Heat Gain: | 99 | |
| $E_h$ (hemispherical emissivity): | 0.169 | |
| EXAMPLE #3 | | |
| Transmission (TY) %: | 56.98 | 58.71 |
| $L^*_T$: | 80.17 | 81.13 |
| $a^*_T$: | −2.82 | −2.82 |
| $b^*_T$: | −2.23 | −2.73 |
| Reflectance as viewed from glass (G) side: $R_GY$ (%): | 15.27 | 14.21 |
| $L^*_G$: | 46 | 44.53 |
| $a^*_G$: | −2.17 | −1.81 |
| $b^*_G$: | −8.63 | −8.95 |
| $\Delta E^*$ (glass (G) side): | | 1.5 |
| $\Delta a^*_G$ (absolute value): | | 0.36 |
| Reflectance as viewed from film/coating (F) side: $R_FY$ (%): | 2.19 | 2.32 |
| $L^*_F$: | 16.47 | 17.1 |
| $a^*_F$: | 13.68 | 13.76 |
| $b^*_F$: | −14.48 | −13.25 |
| $R_s$ (sheet resistance in ohms/sq.) | 11.5 | 10.5 |
| Total Solar T %: | 39 | |
| Solar $R_{out}$: | 19 | |
| U Value: | 0.74 | |
| U Value S: | 0.68 | |
| Shading Coefficient (SC): | 0.55 | |
| SHGC: | 0.47 | |

TABLE 6-continued

Characteristics of Examples 1–4 (Monolithic)

| Value/Measurement | Before Heat Treatment | After Heat Treatment |
|---|---|---|
| Heat Gain: | 119 | |
| $E_h$ (hemispherical emissivity): | 0.170 | |
| EXAMPLE #4 | | |
| Transmission (TY) %: | 50.08 | 51.08 |
| $L^*_T$: | 76.12 | 76.73 |
| $a^*_T$: | −3.61 | −2.88 |
| $b^*_T$: | −5.02 | −4.66 |
| Reflectance as viewed from glass (G) side: $R_GY$ (%): | 14.62 | 13.82 |
| $L^*_G$: | 45.1 | 43.98 |
| $a^*_G$: | −0.59 | −1.36 |
| $b^*_G$: | −4.33 | −4.52 |
| $\Delta E^*$ (glass (G) side): | | 1.4 |
| $\Delta a^*_G$ (absolute value): | | 0.77 |
| Reflectance as viewed from film/coating (F) side: $R_FY$ (%): | 3.83 | 3.67 |
| $L^*_F$: | 23.09 | 22.56 |
| $a^*_F$: | 15.93 | 11.79 |
| $b^*_F$: | 3.51 | 10.42 |
| $R_s$ (sheet resistance in ohms/sq.) | 11.0 | 9.1 |
| Total Solar T %: | 33 | |
| Solar $R_{out}$: | 19 | |
| U Value: | 0.73 | |
| U Value S: | 0.69 | |
| Shading Coefficient (SC): | 0.49 | |
| SHGC: | 0.42 | |
| Heat Gain: | 107 | |
| $E_h$ (hemispherical emissivity): | 0.164 | |

Moreover, each of Examples 1–4 was found to be chemically and mechanically durable as these terms are defined below, both before and after heat treatment.

As can be seen from the above, each of Examples 1–4 had good matchability because, as viewed from the glass (G) side of the respective articles, $\Delta E^*$ was no greater than 2.5, and preferably no greater than 2.0; while $\Delta a^*G$ (the absolute value thereof, as used herein) was no greater than 1.0, and preferably no greater than 0.8. These values (i.e., $\Delta E^*$ and $\Delta a^*$) are important as measured from the glass (G) side of the coated article, as opposed to the film (F) side because viewers in most applications predominantly view the products from the glass sides thereof. With regard to matchability for example, Example 3 had the following values (viewed from the glass (G) side):

| $L^*$ (before HT): 46; | $L^*$ (after HT): 44.53; | $\Delta L^* = 1.47$ |
| $a^*$ (before HT): −2.17; | $a^*$ (after HT): −1.81 | $\Delta a^* = 0.36$ |
| $b^*$ (before HT): −8.63; | $b^*$ (after HT): −8.95 | $\Delta b^* = 0.32$ |

Thus, using the equation $\Delta E^* = [(\Delta L^*)^2 + (\Delta a^*)^2 + (\Delta b^*)^2]^{1/2}$, (i.e., equation (1) above), it can be determined that $[(1.47)^2 + (0.36)^2 + (0.32)^2]^{1/2} = (2.3929)^{1/2} = 1.5 = \Delta E^*$ (glass side). This relatively low glass side reflectance $\Delta E^*$ value indicates good matchability (before versus after heat treatment).

Each of the above-listed monolithic examples also had low-emissivity characteristics as shown by each of the above-listed Examples having a hemispherical emissivity ($E_h$) no greater than 0.25, and more preferably no greater than 0.20, before and/or after heat treatment (HT). Thicker Ag layers may also be used, which would provide lower emissivity and/or sheet resistance than those report here, in accordance with certain embodiments of this invention. Compare these low emissivity values to the hemispherical emissivity values of 0.48 to 0.73 in U.S. Pat. No. 5,688,585. Each of the aforesaid Examples 1–4 was also characterized by low sheet resistance values of $R_S$, no greater than 20 ohms/square, more preferably no greater than 15 ohms/square, and even more preferably no greater than about 12 ohms/square (before and/or after HT). Again, compare these low sheet resistance ($R_S$,) values to the sheet resistance values of 89–269 ohms/square in U.S. Pat. No. 5,688,585. Accordingly, it can be seen that Examples 1–4 herein truly have low-E characteristics while at the same time surprisingly being able to achieve substantial matchability before versus after heat treatment.

Monolithic coated articles according to certain embodiments of this invention preferably have a visible transmittance (TY%) of no greater than about 60%, more preferably from about 40–60% before HT, and most preferably from about 48–58% before HT. Monolithic coated articles according to certain embodiments of this invention preferably have a visible transmittance (TY%) of from about 10–65% after HT, more preferably from about 40–60% after HT. In a similar manner, coated articles according to certain embodiments of this invention preferably have a shading coefficient (SC) of no greater than about 0.65 (before and/or after HT), more preferably from about 0.40 to 0.60 (before and/or after HT). Additionally, monolithic coated articles according to certain embodiments of this invention preferably have a glass side reflectance value ($R_GY$ %) of at least 11%, and more preferably from 12–20% before HT and from about 11–19% after HT.

It can also be seen that according to certain preferred embodiments of this invention monolithic coated articles are characterized by an $a^*_G$ value of from about 0.0 to −5.0, more preferably from about 0.0 to −2.5, before and/or after heat treatment. This enables coated articles according to certain embodiments of this invention to have a desirable neutral or blue-green color, especially when $b^*_G$ is also negative.

The aforesaid characteristics may be measured at a clear float glass nominal substrate thickness of about 6 mm, or any other suitable substrate thickness from 1–12 mm. Moreover, it is noted that the units of Examples 1–4 may ultimately be utilized in the context of an IG unit, a windshield, window or the like.

Each of the aforesaid HT Examples 1–4 was then used in an IG unit as shown in FIG. 2 (e.g., where the insulating chamber or space between the two glass sheets may be filled with a gas such as Ar), with measurements from these IG uses set forth below in Tables 7 and 8:

TABLE 7

Characteristics of Examples 1–4 (IG or IGU)
(IG Unit as shown at the FIG. 2, pane 26 - uncoated 6 mm clear glass)

| Value/Measurement | Before Heat Treatment | After Heat Treatment |
|---|---|---|
| EXAMPLE #1 | | |
| Transmission (TY) %: | 50.17 | 52.52 |
| $L^*_T$: | 76.17 | 77.59 |
| $a^*_T$: | −4.54 | −4.67 |
| $b^*_T$: | −3.54 | −4.08 |
| Reflectance as viewed from outside (out) side: $R_{out}Y$ (%): | 15.15 | 14.45 |
| $L^*_{out}$: | 45.84 | 44.87 |
| $a^*_{out}$: | −2.44 | −1.76 |
| $b^*_{out}$: | −6.66 | −7.15 |
| $\Delta E^*_{out}$ (from glass (out) side): | | 1.34 |
| $\Delta a^*_{out}$ (absolute value): | | 0.68 |
| Reflectance as viewed from film/coating (inside) side: $R_{in}Y$ (%): | 9.81 | 9.82 |

TABLE 7-continued

Characteristics of Examples 1–4 (IG or IGU)
(IG Unit as shown at the FIG. 2, pane 26 - uncoated 6 mm clear glass)

| Value/Measurement | Before Heat Treatment | After Heat Treatment |
|---|---|---|
| $L^*_{in}$: | 37.51 | 37.51 |
| $a^*_{in}$: | 3.01 | 3.46 |
| $b^*_{in}$: | −0.48 | −1.84 |
| Total Solar T %: | 31 | |
| Solar $R_{out}$: | 18 | |
| U Value: | 0.34 | |
| U Value S: | 0.37 | |
| Shading Coefficient (SC): | 0.43 | |
| TY %/SC | 116.7 | |
| SHGC: | 0.39 | |
| Heat Gain: | 96 | |
| EXAMPLE #2 | | |
| Transmission (TY) %: | 39.47 | 40.16 |
| $L^*_T$: | 69.09 | 69.58 |
| $a^*_T$: | −4.95 | −4.51 |
| $b^*_T$: | −4.97 | −5.45 |
| Reflectance as viewed from outside (out) side: $R_{out}Y$ (%): | 18.86 | 18.48 |
| $L^*_{out}$: | 50.53 | 50.07 |
| $a^*_{out}$: | −1.82 | −1.92 |
| $b^*_{out}$: | −3.57 | −3.96 |
| $\Delta E^*_{out}$ (from glass (out) side): | | 0.54 |
| $\Delta a^*_{out}$ (absolute value): | | 0.1 |
| Reflectance as viewed from film/coating (inside) side: $R_{in}Y$ (%): | 11.11 | 11.04 |
| $L^*_{in}$: | 39.77 | 39.65 |
| $a^*_{in}$: | 5.77 | 5.32 |
| $b^*_{in}$: | 3.03 | 3.50 |
| Total Solar T %: | 24 | |
| Solar $R_{out}$: | 21 | |
| U Value: | 0.34 | |
| U Value S: | 0.36 | |
| Shading Coefficient (SC): | 0.36 | |
| TY %/SC | 109.6 | |
| SHGC: | 0.31 | |
| Heat Gain: | 78 | |
| EXAMPLE #3 | | |
| Transmission (TY) %: | 50.50 | 51.84 |
| $L^*_T$: | 76.37 | 77.18 |
| $a^*_T$: | −4.21 | −4.19 |
| $b^*_T$: | −1.94 | −2.34 |
| Reflectance as viewed from outside (out) side: $R_{out}Y$ (%): | 17.93 | 17.35 |
| $L^*_{out}$: | 49.41 | 48.69 |
| $a^*_{out}$: | −2.68 | −2.58 |
| $b^*_{out}$: | −8.14 | −8.44 |
| $\Delta E^*_{out}$ (from glass (out) side): | | 0.70 |
| $\Delta a^*_{out}$ (absolute value): | | 0.1 |
| Reflectance as viewed from film/coating (inside) side: $R_{in}Y$ (%): | 9.47 | 9.52 |
| $L^*_{in}$: | 36.87 | 36.97 |
| $a^*_{in}$: | 3.21 | 3.39 |
| $b^*_{in}$: | −5.91 | −5.83 |
| Total Solar T %: | 32 | |
| Solar $R_{out}$: | 20 | |
| U Value: | 0.34 | |
| U Value S: | 0.36 | |
| Shading Coefficient (SC): | 0.46 | |
| TY %/SC | 109.8 | |
| SHGC: | 0.4 | |
| Heat Gain: | 97 | |
| EXAMPLE #4 | | |
| Transmission (TY) %: | 44.41 | 45.60 |
| $L^*_T$: | 72.50 | 73.28 |
| $a^*_T$: | −4.91 | −4.28 |
| $b^*_T$: | −4.37 | −4.18 |
| Reflectance as viewed from outside (out) side: $R_{out}Y$ (%): | 16.84 | 16.04 |
| $L^*_{out}$: | 48.05 | 47.02 |
| $a^*_{out}$: | −1.31 | −1.87 |

TABLE 7-continued

Characteristics of Examples 1–4 (IG or IGU)
(IG Unit as shown at the FIG. 2, pane 26 - uncoated 6 mm clear glass)

| Value/Measurement | Before Heat Treatment | After Heat Treatment |
|---|---|---|
| $b^*_{out}$: | −4.81 | −4.97 |
| $\Delta E^*_{out}$ (from glass (out) side): |  | 1.18 |
| $\Delta a^*_{out}$ (absolute value): |  | 0.56 |
| Reflectance as viewed from film/coating (inside) side: $R_{in}Y$ (%): | 10.57 | 10.47 |
| $L^*_{in}$: | 38.86 | 38.67 |
| $a^*_{in}$: | 5.70 | 3.75 |
| $b^*_{in}$: | −0.05 | 2.59 |
| Total Solar T %: | 27 |  |
| Solar $R_{out}$: | 20 |  |
| U Value: | 0.34 |  |
| U Value S: | 0.36 |  |
| Shading Coefficient (SC): | 0.4 |  |
| TY %/SC | 111 |  |
| SHGC: | 0.35 |  |
| Heat Gain: | 86 |  |

For each of Examples 1–4, it can be seen from the Tables above that $\Delta E^*$ improved when used in the context of an IG unit (e.g., see FIG. 2). For products with higher visible transmittance (e.g., Examples 1 and 3), the $\Delta E^*$ improvement (i.e., $\Delta E^*$ improvement may be characterized by $\Delta E^*_{mono}-\Delta E^*_{iG}$) is was slightly better than the $\Delta E^*$ improvement for the lower visible transmittance examples (e.g., Examples 2 and 4). As shown in Table 8 below, the $\Delta E^*$ improvements (i.e., $\Delta E^*_{mono}-\Delta E^*_{IG}$) for Examples 1–4 were 0.57, 0.21, 0.85, and 0.19, respectively. It is noted that for Table 8 below, the reflective glass side $\Delta E^*$ value for the IG versions of Examples 1–4 was measured twice (2) with a Hunter Lab UltraScan XE Spectrophotometer, the two measurements illustrating, for example, instrument inaccuracy.

exterior/glass (G) side of the coated article (outside of the FIG. 2 structure), because viewers in most applications predominantly view a the products from e.g., outside of the building in which the IG unit is installed.

Each of the above-listed IG units had low-emissivity and sheet resistance characteristics as discussed above relative to monolithic embodiments. IG units according to certain embodiments of this invention preferably have a visible transmittance (TY%) of no greater than about 60%, more preferably from about 30–60% before HT, and most preferably from about 35–55% before HT. IG coated articles according to certain embodiments of this invention preferably have a visible transmittance (TY%) of from about 10–55% after HT, more preferably from about 35–55% after HT. In a similar manner, coated articles according to IG embodiments of this invention preferably have a shading coefficient (SC) of no greater than about 0.50 (before and/or after HT), more preferably from about 0.25 to 0.47 (before and/or after HT). Additionally, IG coated articles (e.g., FIG. 2) according to certain embodiments of this invention preferably have a glass side reflectance value ($R_GY$ %) of from about 10–22% before HT and/or after HT.

It can also be seen that according to certain preferred embodiments of this invention IG embodiments are characterized by an $a^*_G$ (equivalent to $a^*_{out}$) value of from about 0.0 to −5.0, more preferably from about 0.0 to −3.0, before and/or after heat treatment. This enables coated articles according to certain embodiments of this invention to have a desirable neutral or blue-green color, especially when $b^*_G$ is also negative.

Finally, in certain preferred IG embodiments of this invention, the ratio of visible transmission (TY%) to shading coefficient (SC) (i.e., TY%/SC) is preferably no greater than 125.0, more preferably from about 90 to 125, and most preferably from about 100 to 120. In certain IG embodiments, this is combined with a total solar transmittance of from about 20–34%, more preferably from about 24–33%.

TABLE 8

$\Delta E^*$ for Examples 1–4 (Mono vs. IG)

| Measurement | Ex. #1 Monolithic | Ex #1 IG | Ex #2 Monolithio | Ex. #2 IG | Ex. #3 Monolithic | Ex #3 IG | Ex. #4 Monolithic | Ex. #4 IG |
|---|---|---|---|---|---|---|---|---|
| T vis (%) | 56.36 |  | 44.19 |  | 56.98 |  | 50.08 |  |
| $\Delta E^*_g$ | 1.9 | 1.34 | 0.8 | 0.54 | 1.5 | 0.70 | 1.4 | 1.18 |
| $\Delta a^*g$ | 0.42 | 0.68 | 0.11 | 0.10 | 0.36 | 0.10 | 0.77 | 0.56 |
| $\Delta E^*g$ (2) | 1.87 |  | 0.59 |  | 1.33 |  | 1.49 |  |
| $\Delta a^*g$ (2) | 0.80 |  | 0.17 |  | 0.21 |  | 0.67 |  |
| $\Delta E^*_{mono} - \Delta E^*_{IGU}$ |  | 0.57 |  | 0.21 |  | 0.85 |  | 0.19 |
| $\Delta E^*_{(2)mono} - \Delta E^*_{IGU}$ |  | 0.53 |  | 0.05 |  | 0.63 |  | 0.31 |
| $\Delta E^*$ % improvement |  | 29.8 |  | 28.3 |  | 54.7 |  | 14.0 |

(2) - Repeated measurement showing instrument accuracy

As can be seen from the above in Tables 7 and 8, in the context of an IG unit as shown in FIG. 2, each of the coatings of Examples 1–4 had good matchability because, as viewed from the outside of the respective articles (e.g., outside of a structure such as a building in which the IG unit is installed), $\Delta E^*$ was no greater than 3.0, more preferably no greater than 2.5, and even more preferably no greater than 2.0, and most preferably no greater than about 1.5 (e.g., for Example 1, $\Delta E^*$ (outside reflectance) in an IG unit was measured at 1.34, for Example 2 it was 0.54, for Example 3 it was 0.70, and for Example 4 it was 1.18); while $\Delta a^*_{outside}$ (the absolute value thereof, as used herein) was no greater than 1.0, and preferably no greater than 0.8. These values (i.e., $\Delta E^*$ and $\Delta a^*$) are important as measured from the outside/

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_xY$ or $R_x$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emittance" and "transmittance" are well understood in the art and are used herein according to their well known meaning. Thus, for example, the term "transmittance" herein means solar transmittance, which is made up of visible light transmittance (TY), infrared radiation transmittance, and ultraviolet radiation transmittance. Total solar energy transmittance (TS) is then usually characterized as a weighted average of these other values. With respect to these transmittances, visible transmittance, as reported herein, is characterized by the standard CIE Illuminant C, 2 degree observer, technique at 380–720 nm; near-infrared is 720–2500 nm; ultraviolet is 300–800 nm; and total solar is 300–2500 nm. For purposes of emittance, however, a particular infrared range (i.e. 2,500–40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrogard spectrophotometer manufactured by Pacific Scientific Corporation. This device measures and reports visible transmittance directly. As reported and measured herein, visible transmittance (i.e. the Y value in the CIE tristimulus system, ASTM E-308-85) uses the Ill. C.,2 degree observer.

"Emittance" (E) is a measure, or characteristic of both absorption and reflectance of light at given wavelengths. When transmittance is zero, which is approximately the case for float glass with wavelengths longer than 2500 nm, the emittance may be represented by the formula:

$$E = 1 - \text{Reflectance}_{film}$$

For architectural purposes, emittance values become quite important in the so-called "mid-range", sometimes also called the "far range" of the infrared spectrum, i.e. about 2,500–40,000 nm., for example, as specified by the WINDOW 4.1 program, LBL-35298 (1994) by Lawrence Berkeley Laboratories, as referenced below. The term "emittance" as used herein, is thus used to refer to emittance values measured in this infrared range as specified by ASTM Standard B 1585-93 for measuring infrared energy to calculate emittance, entitled "Standard Test Method for Measuring and Calculating Emittance of Architectural Flat Glass Products Using Radiometric Measurements". This Standard, and its provisions, are incorporated herein by reference. In this Standard, emittance is reported as hemispherical emittance ($E_h$) and normal emittance ($E_n$).

The actual accumulation of data for measurement of such emittance values is conventional and may be done by using, for example, a Beckman Model 4260 spectrophotometer with "VW" attachment (Beckman Scientific Inst. Corp.). This spectrophotometer measures reflectance versus wavelength, and from this, emittance is calculated using the aforesaid ASTM E 1585-93 which has been incorporated herein by reference.

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

"Chemical durability" or "chemically durable" is used herein synonymously with the term of art "chemically resistant" or "chemical stability". Chemical durability is determined by boiling a 2"x5" sample of a coated glass substrate in about 500 cc of 5% HCl for one hour (i.e. at about 220° F.). The sample is deemed to pass this test (and thus the layer system is "chemically resistant" or is deemed to be "chemically durable" or to have "chemical durability") if the sample's layer system shows no visible discoloration or visible peeling, and no pinholes greater than about 0.003" in diameter after this one hour boil.

"Mechanical durabilility" as used herein is defined by the following tests. The test uses a Pacific Scientific Abrasion Tester (or equivalent) wherein a 2"x4"x1" nylon brush is cyclically passed over the layer system in 500 cycles employing 150 gm of weight, applied to a 6"x17" sample. In this test, if no substantial, noticeable scratches appear when viewed with the naked eye under visible light, the test is deemed passed, and the article is said to be "mechanically durable" or to have "mechanical durability".

The terms "heat treatment" and "heat treating" as used herein mean heating the article to a temperature sufficient to enabling thermal tempering, bending, or heat strengthening of the glass inclusive article. This definition includes, for example, heating a coated article to a temperature of at least about 1100 degrees F. (e.g., to a temperature of from about 550 degrees C. to 900 degrees C.) for a sufficient period to enable tempering.

The term "U-value" or "U-Factor" (synonymous with "thermal transmittance") is a term well understood in the art and is used herein according to this well known meaning. "U-value" herein is reported in terms of BTU/hr/ft²/degrees F., and may be determined according to the guarded hot box method as reported in, and according to ASTM designation: C1199-91.

The term "shading coefficient" is a term well understood in the art and is used herein according to its well known meaning. It is determined according to ASHRAE Standard 142 "Standard Method for Determining and Expressing the Heat Transfer and Total Optical Properties of Fenestration Products" by ASHRAE Standards Project Committee, SPC 142, September 1995.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. An insulating glass (IG) window unit comprising:
   first and second glass substrates sealed together proximate their respective peripheral edges so as to form an insulating space therebetween;
   a layer system supported by one of said glass substrates proximate said insulating space, said layer system comprising an infrared (IR) reflecting silver layer located between first and second dielectric layers; and
   wherein said IG unit has a ΔE* value (exterior or outside) no greater than 2.5 after or due to heat treatment.

2. The IG unit of claim 1, wherein said IG unit has a ΔE* value (exterior or outside) no greater than 2.0 following or due to heat treatment.

3. The IG unit of claim 2, wherein said IG unit has a ΔE* value (exterior or outside) no greater than 1.5 following or due to thermal tempering.

4. The IG unit of claim 1, wherein said IG unit has a ΔE* value (exterior or outside) no greater than 2.0 following or due to thermal tempering, and wherein said IG unit has a color characterized by $a^*_G$ and $b^*_G$ color coordinate values both being negative.

5. The IG unit of claim 1, wherein said layer system further includes a first layer including Ni or NiCr located between said silver layer and said first dielectric layer, and a second layer including Ni or NiCr located between said silver layer and said second dielectric layer.

6. The IG unit of claim 5, wherein said first and second dielectric layers comprise silicon nitride.

7. The IG unit of claim 6, wherein each of said first and second Ni or NiCr inclusive layers is at least 20 angstroms (Å) thick.

8. The IG unit of claim 7, wherein said layer system comprises the recited layers at the following thicknesses, where the first silicon nitride inclusive layer is located between said one glass substrate and the first Ni or NiCr inclusive layer:
   first silicon nitride inclusive layer: 300–380 Å thick
   first Ni or NiCr inclusive layer: 20–150 Å thick
   silver layer: 40–120 Å thick
   second Ni or NiCr inclusive layer: 20–150 Å thick
   second silicon nitride inclusive layer: 400–500 Å thick.

9. The coated article of claim 8, wherein said layer system comprises the recited layers at the following thicknesses:
   first silicon nitride inclusive layer: 320–360 Å thick
   first Ni or NiCr inclusive layer: 20–90 Å thick
   silver layer: 60–80 Å thick
   second Ni or NiCr inclusive layer: 20–90 Å thick
   second silicon nitride inclusive layer: 420–480 Å thick.

10. The IG unit of claim 1, wherein said IG unit has a Δa* value (exterior or outside) no greater than 1.0.

11. The IG unit of claim 1, wherein said IG unit has a Δa* value (exterior or outside) no greater than 0.8 after or due to heat treatment.

12. The IG unit of claim 1, wherein said one substrate with said layer system thereon has a hemispherical emissivity ($E_h$) of no greater than 0.25.

13. The IG unit of claim 12, wherein said one substrate with said layer system thereon has a hemispherical emissivity ($E_h$) of no greater than 0.20.

14. The IG unit of claim 1, wherein said one substrate with said layer system thereon has a sheet resistance value $R_S$, no greater than 20 ohms/square.

15. The IG unit of claim 14, wherein said one substrate with said layer system thereon has a sheet resistance value $R_S$ no greater than 15 ohms/square.

16. The IG unit of claim 15, wherein said one substrate with said layer system thereon has a sheet resistance value $R_s$ no greater than 12 ohms/square.

17. The IG window unit of claim 1, wherein the IG window unit has a visible transmittance of from 10–55%.

18. The IG window unit of claim 1, wherein the IG window unit has a ΔE* value (exterior or outside) no greater than 1.0.

19. An insulating glass (IG) unit comprising:
   first and second substrates sealed together;
   a layer system provided on said first substrate, said layer system comprising from the first substrate outwardly, a first silicon nitride inclusive layer, a first Ni or NiCr inclusive layer, an IR reflecting metal layer, a second Ni or NiCr inclusive layer, and a second silicon nitride inclusive layer, wherein each of said first and second Ni or NiCr inclusive layers is at least about 20 Å thick; and
   wherein said first substrate with said layer system thereon has a hemispherical emissivity ($E_h$) of no greater than 0.25 before heat treatment, a sheet resistance $R_S$ no greater than 20 ohms/square before heat treatment, and a ΔE* value (glass side or outside) no greater than 2.5 after or due to heat treatment.

20. The IG unit of claims 19, wherein said first substrate with said layer system thereon has a ΔE* value no greater than 2.0.

21. The IG unit of claim 19, wherein the IG window unit has a visible transmittance of from 10–55%.

22. The IG unit of claim 19, wherein the IG window unit has a ΔE* value (exterior or outside) no greater than 1.5.

23. A thermally insulating panel assembly comprising:
   first and second substrates seal together proximate their respective peripheries to form an insulating space therebetween;
   a layer system provided on said first substrate, said layer system comprising from the first substrate outwardly, a first silicon nitride inclusive layer 300 to 380 Å thick, a first Ni or NiCr inclusive layer from 20 to 90 Å thick, a silver layer from 40–120 Å thick, a second Ni or NiCr inclusive layer from 20 to 90 Å thick, and a second silicon nitride inclusive layer;
   wherein said first substrate with said layer system thereon has a hemispherical emissivity ($E_h$) of no greater than 0.25 and a sheet resistance $R_s$ no greater than 20 ohms/square; and
   wherein the IG unit has a visible transmission of no greater than 10–55%, and a ΔE* value (glass side or outside) no greater than 2.5 after or due to heat treatment.

24. The panel assembly of claim 23, Wherein the first substrate with said layer system thereon is heat treated and has a ΔE* value (outside or substrate side) no greater than 2.0.

25. A coated article comprising:
   a layer system supported by a glass substrate, said layer system comprising an infrared (IR) reflecting silver layer located between first and second dielectric layers; and
   wherein said coated article is characterized by a glass side or outside $R_{solar}$ which is greater than a glass side or outside visible reflectance $R_{(G\ or\ out)}$, and a visible transmittance (TY or $T_{vis}$) of from about 10–65%, and has a ΔE* value (glass side or outside) no greater than 2.5 after or due to heat treatment.

26. The coated article of claim 25, wherein said coated article has a ΔE* value (glass side) no greater than 2.0 after or due to heat treatment.

27. The coated article of claim 25, Wherein said layer system further includes a first layer including Ni or NiCr located between said silver layer and said first dielectric layer, and a second layer including Ni or NiCr located between said silver layer and said second dielectric layer.

28. The coated article of claim 27, wherein said coated article has a hemispherical emissivity ($E_h$) of no greater than 0.20, both before and after heat treatment.

29. The coated article of claim 28, wherein said coated article has a sheet resistance value $R_s$ no greater than 20 ohms/square before heat treatment.

30. The coated article of claim 28, wherein said first and second dielectric layers comprise silicon nitride.

31. The coated article of claim 25, wherein the coated article makes up a portion of an insulating glass (IG) window unit.

32. The coated article of claim 25, wherein the coated article has a ΔE* value (glass side or outside) no greater than 1.5 after or due to heat treatment.

33. The coated article of claim 25, wherein the coated article has a ΔE* value (glass side or outside) no greater than 1.0 after or due to heat treatment.

* * * * *